H. DOEBLER.
MINUTE BOOK FOR DELIBERATIVE BODIES.
APPLICATION FILED MAY 11, 1909.
1,028,085. Patented May 28, 1912.
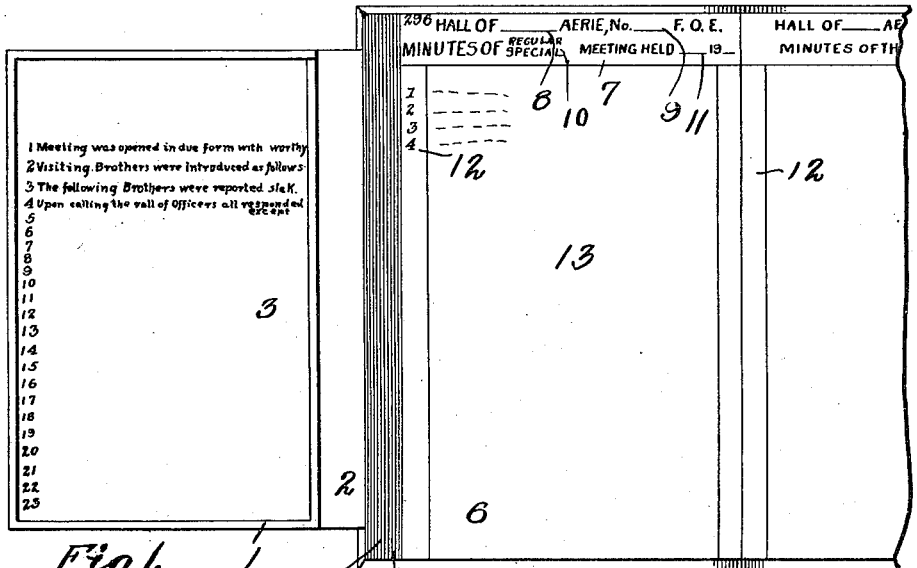
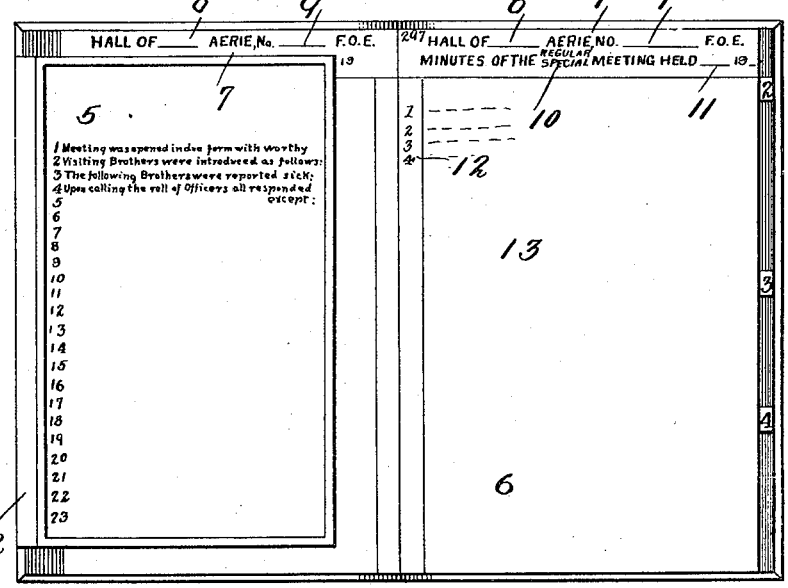
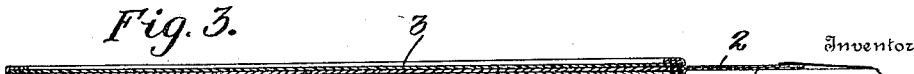

UNITED STATES PATENT OFFICE.

HUGO DOEBLER, OF DELAWARE, OHIO, ASSIGNOR OF ONE-THIRD TO FRANK D. KING AND ONE-THIRD TO JOHN F. GAYNOR, OF DELAWARE, OHIO.

MINUTE-BOOK FOR DELIBERATIVE BODIES.

1,028,085.      Specification of Letters Patent.      Patented May 28, 1912.

Application filed May 11, 1909. Serial No. 495,299.

*To all whom it may concern:*

Be it known that I, HUGO DOEBLER, a citizen of the United States, residing at Delaware, in the county of Delaware and State of Ohio, have invented certain new and useful Improvements in Minute-Books for Deliberative Bodies, of which the following is a specification.

My invention relates to books for keeping the minutes of the business transacted by deliberative bodies and has for its object the provision of means for saving secretaries the time and labor expended in writing out in full the catch words and phrases relating to the different heads under the order of business. This I accomplish by having the minute book provided with a flap comprising a frame having sheets of transparent material such as celluloid secured therein, between which is secured a card having the catch words and phrases for the different heads of business printed on its two sides, the different heads being numerically arranged. The pages of the minute book have a column at their left side to enter the number corresponding to the numeral on the card having the catch words or phrases for the various heads of business as they are taken up in their order, the secretary continuing the sentence from where left off on the card on the body of the page beginning opposite the number in the left hand column.

The minute book will be described in detail hereinafter and illustrated in the accompanying drawings in which—

Figure 1 is a plan view of my improved minute book showing it open and in position to record the minutes on the left hand page, Fig. 2, a similar view showing it in position to record the minutes on the right hand page, and Fig. 3, a cross section of the frame.

In the drawings similar reference characters indicate corresponding parts in the several views.

My improved minute book A has a frame 1 secured to the side edge of the front by means of a flexible hinge 2, said frame having sheets of celluloid 3 secured therein between which is secured a card 4 having printed, or otherwise inscribed on its two sides, catch words and phrases beginning the various heads of business arranged in their order as shown at 5, each head of business having a numeral before it indicating the number of the order of business, said catch words and phrases being arranged in the order in which the business of the organization, for which the book is arranged, is to be transacted. The pages 6 of the book A each have a heading 7 with suitably designated spaces 8 and 9 for the name and number of the organization and an introductory line 10 reading substantially as follows "Minutes of the regular (special) meeting held" with a space 11 following for the insertion of the date of the meeting, it being intended that one or the other words immediately preceding the word "meeting" be canceled so as to make the line read properly whether the meeting be a regular or a special one. The body of each page, below the heading 7, is provided with a column 12 at the left to receive numerals corresponding to the numerals at the beginning of each of the catch word lines 5 as the different heads of business are taken up in their order, the continuance of the sentences completing the record of the business transacted under each head of business being inscribed in the space 13 to the right of column 12, beginning on the line opposite the numeral indicating the catch words for the business transacted.

By constructing the frame with both sides provided with transparent plates or sheets as described and securing it to the edge of the front cover as stated it will be apparent that when recording the minutes on the left hand pages the frame is thrown over, as shown in Fig. 1, so that it lies outside of the book, while when recording the minutes on the right hand page the frame is placed in the position shown in Fig. 2 lying on top of the left hand page so that the matter on card 4 is as close as possible to the record, the frame being held in the same positions when reading the minutes.

Should more than one page of the book be required to record the minutes of any single meeting they may be continued on to the next succeeding page ignoring the heading 7 and the matter therein on the second and succeeding pages. The minutes of each meeting are to be recorded by beginning on a fresh page.

Having thus described my invention what I claim is—

1. In a minute book, in combination with the leaves and cover an open frame secured to the outer edge of one of the leaves of the cover, a card in the frame having catch words and phrases on both sides thereof, and comprising the beginning of the record of the different heads in the order of business, said catch words and phrases being numerically arranged and numbered progressively, and the leaves of the book having each page provided with a suitably designated left hand column for entering the numeral corresponding to the numeral on the card for the order of business to be transacted, and a suitably designated space to the right of the column for inscribing the record beginning after the catch words on the card, said frame being adapted to lie outside of the cover, to fold against the inside of the cover, or to lie on the near page of the book when inscribing on the farther page.

2. A minute book comprising a cover and leaves, an open frame secured to the side edge of the front cover by means of a flexible hinge, plates of transparent material secured in said frame and spaced apart, a card secured between said transparent plates having catch words and phrases on both sides thereof comprising the beginning of the record of the different heads of business to be inscribed in the book, said catch words and phrases being arranged numerically and numbered progressively, and the leaves of the book having each page provided with a heading having suitably designated spaces for the title of the organization and date of meeting, the page below the heading having a suitably designated column at the left to enter the number of the order of business corresponding to the number opposite the catch words aforesaid, and a suitably designated space to the right of the column aforesaid for inscribing the record of the business beginning after the catch words or phrases on the card.

3. A minute book comprising a cover and leaves, an open rectangular frame secured to the side edge of the front cover by means of a flexible hinge, plates of transparent material secured in the frame and spaced apart, a card secured between said transparent plates and having catch words and phrases on both sides thereof comprising the beginning of the record of the different heads of business to be inscribed in the book, said catch words and phrases being numerically arranged and numbered progressively, the leaves of the book having each page provided with a suitably designated column for entering the numeral corresponding to the numeral on the card opposite the catch word or phrase indicating the order of business to be transacted, and a suitably designated space to the right of the column aforesaid for inscribing the transactions of each order of business beginning after the catch words on the card, said frame being adapted to be turned to lie outside of the book when inscribing or reading the minutes on the left hand page of the book, and to lie on the inside of the cover or on the left hand page when inscribing or reading the minutes on the right hand page and for transportation.

In testimony whereof I hereto affix my signature in the presence of two witnesses.

HUGO DOEBLER.

Witnesses:
J. F. GAYNOR,
F. D. KING.